(12) United States Patent
Montgomery et al.

(10) Patent No.: US 9,782,717 B2
(45) Date of Patent: Oct. 10, 2017

(54) HYDROCARBON SEPARATION SYSTEM

(71) Applicant: Caterpillar Inc., Peoria, IL (US)

(72) Inventors: David T. Montgomery, Edelstein, IL (US); Victor L. Sheldon, Jr., West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/887,601

(22) Filed: Oct. 20, 2015

(65) Prior Publication Data

US 2017/0106328 A1    Apr. 20, 2017

(51) Int. Cl.
    *B01D 53/04*      (2006.01)
    *C10L 3/10*      (2006.01)
    *F02C 7/055*      (2006.01)
    *F02C 7/22*      (2006.01)
    *F02C 7/057*      (2006.01)
    *F02M 35/10*      (2006.01)
    *F02M 35/024*      (2006.01)

(52) U.S. Cl.
CPC ..... *B01D 53/0454* (2013.01); *B01D 53/0446* (2013.01); *C10L 3/101* (2013.01); *F02C 7/055* (2013.01); *F02C 7/057* (2013.01); *F02C 7/222* (2013.01); *F02M 35/024* (2013.01); *F02M 35/10216* (2013.01); *B01D 2256/24* (2013.01); *B01D 2257/7022* (2013.01); *B01D 2257/7025* (2013.01); *B01D 2259/402* (2013.01); *B01D 2259/40009* (2013.01); *C10L 2290/542* (2013.01)

(58) Field of Classification Search
CPC ............ B01D 53/0454; B01D 53/0446; B01D 2256/24; B01D 2257/7022; B01D 2257/7025; B01D 2259/40009; B01D 2259/402; C10L 3/101; C10L 2290/542; F02C 7/055; F02C 7/057; F02C 7/222; F02M 35/024; F02M 35/10216
USPC .......... 95/8, 11, 141, 143; 96/109, 111, 121; 585/820, 821
See application file for complete search history.

(56) References Cited

U.S. PATENT DOCUMENTS

| | | | |
|---|---|---|---|
| 4,966,611 A | * | 10/1990 | Schumacher ...... B01D 53/0454 95/141 |
| 5,171,333 A | * | 12/1992 | Maurer .................. B01D 53/02 95/100 |

(Continued)

*Primary Examiner* — Frank Lawrence
(74) *Attorney, Agent, or Firm* — Miller, Matthias & Hull LLP; Daniel D. DeMarah (57) ABSTRACT

A hydrocarbon separation system for an engine fuel supply system is disclosed. The hydrocarbon separation system may include an untreated gas conduit configured to transport a raw gas stream including methane, ethane and higher carbon chainlength hydrocarbon molecules. The system may also include a separator downstream of and fluidly coupled to the untreated gas conduit configured to segregate methane or ethane of the raw gas stream from the higher carbon chainlength hydrocarbon molecules of the raw gas stream. A treated gas conduit may be located downstream of and fluidly coupled to the separator and be configured to transport the methane or ethane of the raw gas stream away from the separator. Lastly, the system may include an electronic controller configured to receive a breakthrough signal and transmit a regeneration signal in response to the breakthrough signal.

16 Claims, 7 Drawing Sheets

(56) References Cited

U.S. PATENT DOCUMENTS

| | | | |
|---|---|---|---|
| 5,245,099 A * | 9/1993 | Mitariten | C10G 55/04 |
| | | | 585/650 |
| 5,972,077 A | 10/1999 | Judkins et al. | |
| 7,799,117 B1 * | 9/2010 | Li | B01D 53/0462 |
| | | | 95/105 |
| 7,954,490 B2 * | 6/2011 | Jagger | A61M 16/10 |
| | | | 128/201.25 |
| 8,784,535 B2 | 7/2014 | Ravikovitch et al. | |
| 2008/0282612 A1 * | 11/2008 | De Bas | B01D 53/002 |
| | | | 48/127.7 |
| 2011/0031103 A1 | 2/2011 | Deckman et al. | |
| 2012/0079852 A1 | 4/2012 | Northrop et al. | |
| 2012/0222552 A1 * | 9/2012 | Ravikovitch | B01D 53/0438 |
| | | | 95/97 |
| 2016/0145517 A1 * | 5/2016 | Matteucci | B01D 53/02 |
| | | | 585/826 |

* cited by examiner

HYDROCARBON SEPARATION SYSTEM

TECHNICAL FIELD

This disclosure generally relates to an engine fuel supply system, and more particularly to a hydrocarbon separation system for an engine fuel supply system.

BACKGROUND

An engine fuel supply system associated with a gas pipeline compressor engine may include a hydrocarbon separation system. The hydrocarbon separation system may include a raw gas conduit fluidly connecting a raw gas supply to a separator, and a purified gas conduit fluidly connecting the separator to the gas pipeline compressor engine. The separator may be configured to isolate methane of the raw gas supply from higher carbon chainlength hydrocarbon molecules such as ethane, propane, butane, and the like, and in doing so, providing the gas pipeline compressor engine with a source of fuel for operation.

One hydrocarbon separation system design is described by Exterran (www.exterran.com) and is known as the JT System. As seen there, this publication describes a hydrocarbon separation system including a gas/gas exchanger and chiller for precooling a raw gas stream, a methanol injection system to prevent the formation of hydrates, a Joule-Thomson valve for expanding and cryogenically cooling the raw gas stream, and a separation drum for isolating gaseous methane from the higher carbon chainlength hydrocarbon molecules of the raw gas supply.

Importantly, the Exterran separation system describes the use of a gas/gas exchanger and chiller for precooling a raw gas stream and a Joule-Thomson valve for expanding and further cooling the raw gas stream to cryogenic temperatures, thereby necessitating the use of a methanol injection system to prevent the formation of hydrates in the purified gas stream. Accordingly, a need exists to provide a hydrocarbon separation system for a gas pipeline compressor engine that isolates methane and/or ethane from propane, butane, isobutane and pentane and isopentane, and other higher carbon chainlength hydrocarbon molecules, without needing to cool the raw gas supply to cryogenic temperatures.

The present disclosure is directed to overcoming one or more problems set forth above and/or other problems associated with the prior art.

SUMMARY

In accordance with one aspect of the present disclosure, a hydrocarbon separation system for an engine fuel supply system is disclosed. The hydrocarbon separation system may include an untreated gas conduit configured to transport a raw gas stream including methane, ethane and higher carbon chainlength hydrocarbon molecules. The system may also include a separator downstream of and fluidly coupled to the untreated gas conduit configured to segregate methane or ethane of the raw gas stream from the higher carbon chainlength hydrocarbon molecules of the raw gas stream. A treated gas conduit may be located downstream of and fluidly coupled to the separator and be configured to transport the methane or ethane of the raw gas stream away from the separator. Lastly, the system may include an electronic controller configured to receive a breakthrough signal and transmit a regeneration signal in response to the breakthrough signal.

In accordance with another aspect of the present disclosure, an engine system is disclosed. The engine system may include an engine and an intake manifold upstream of and fluidly coupled to the engine configured to transport a treated gas stream including methane or ethane to the engine. A treated gas conduit may be located upstream of and be fluidly coupled to the intake manifold that may be configured to transport the treated gas stream to the intake manifold. A separator may be positioned upstream of and be fluidly coupled to the treated gas conduit that may be configured to isolate the methane or ethane of a raw gas stream from higher carbon chainlength hydrocarbon molecules of the raw gas stream. Upstream of the separator, an untreated gas conduit may be fluidly coupled to the separator that may be configured to transport the raw gas stream including the methane, the ethane and the higher carbon chainlength hydrocarbon molecules, to the separator. Next, a fuel source upstream of and fluidly coupled to the untreated gas conduit may be configured to deliver the raw gas stream including the methane, ethane and the higher carbon chainlength hydrocarbon molecules. Finally, the engine system may include an electronic controller configured to receive a breakthrough signal and transmit a regeneration signal in response to the breakthrough signal.

In accordance with another embodiment of the present disclosure, a method of delivering fuel to an engine is disclosed. The method may include configuring a separator to segregate methane or ethane of a raw gas stream from higher chainlength hydrocarbon molecules of the raw gas stream. Moreover, the method may include fluidly coupling an untreated gas conduit to the separator, the untreated gas conduit located upstream of the separator and configured to transport the raw gas stream to the separator and associating a valve with the untreated gas conduit configured to receive a regeneration signal and change flow direction of the raw gas stream through the separator. Further, the method may include fluidly coupling a treated gas conduit to the separator, the treated gas conduit located downstream of the separator and configured to transport the methane or ethane of the raw gas stream away from the separator towards the engine. In a next step, the method may include determining whether the separator needs to be regenerated. Finally, the method may include sending a regeneration signal to the separator when the separator needs to be regenerated.

These and other aspects and features of the present disclosure will be more readily understood when read in conjunction with the accompanying drawings.

DETAILED DESCRIPTION OF THE DISCLOSURE

Figure 1:
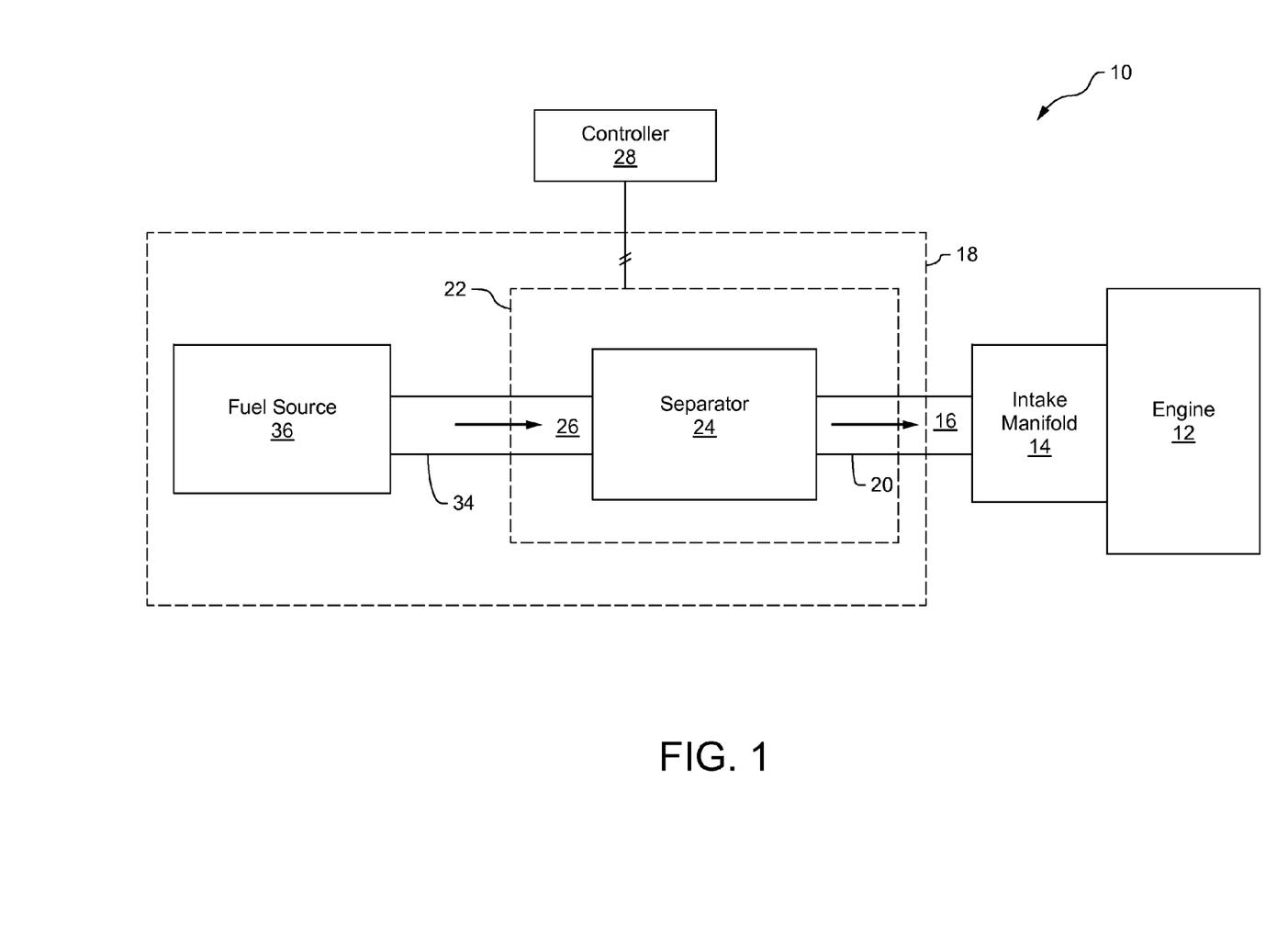
FIG. 1 is a block diagram of an exemplary engine system according to one aspect of the present disclosure.

Various aspects of the disclosure will now be described with reference to the drawings, wherein like reference numbers refer to like elements, unless specified otherwise. Referring to FIG. 1, a block diagram of an exemplary engine system 10 is illustrated, according to an aspect of the disclosure. The engine system 10 includes an engine 12, which may be an internal combustion engine such as a reciprocating piston engine or a gas turbine engine, for example. According to an aspect of the disclosure, the engine 12 is a spark ignition engine or a compression ignition engine such as a diesel engine, a homogenous charge compression ignition engine, or a reactivity controlled compression ignition engine, or other compression ignition engine 12 known in the art.

The engine 12 may include other systems such as a drivetrain including a transmission system, and so on. The engine 12 may be used to provide power to any machine including, but not limited to, an on-highway truck, an off-highway truck, an earth moving machine, an electric generator, and so on. In a preferred embodiment, the engine system 10 may be used to provide power to a compressor, such as a reciprocating, screw-type, or centrifugal compressor, associated with a natural gas pipeline compression station. However, engine system 10 may be associated with any industry including, but not limited to, transportation, construction, forestry, agriculture, material handling and the like. The engine system 10 may include an intake manifold 14 upstream of and fluidly coupled to the engine 12. The intake manifold 14 may be configured to transport a treated gas stream 16 including methane and/or ethane to the engine 12.

The engine system 10 may also include a fuel supply system 18 that is fluidly coupled to the intake manifold 14 via a treated gas conduit 20. The treated gas conduit 20 may be upstream of and fluidly coupled to the intake manifold 14 and may be configured to transport a treated gas stream 16 to the intake manifold 14. The fuel supply system 18 may additionally include a hydrocarbon separation system 22 that is upstream of and fluidly coupled with the treated gas conduit 20. The hydrocarbon separation system 22 may include a separator 24 configured to isolate methane and/or ethane of a raw gas stream 26 from other higher carbon chainlength hydrocarbon molecules of the raw gas stream 26 and therefore create the treated gas stream 16. For example, the separator 24 may be configured to separate methane and/or ethane from propane, propene, butane, isobutane, pentane, isopentane and other higher carbon chainlength hydrocarbon molecules found in the raw gas stream 26.

Figure 5:
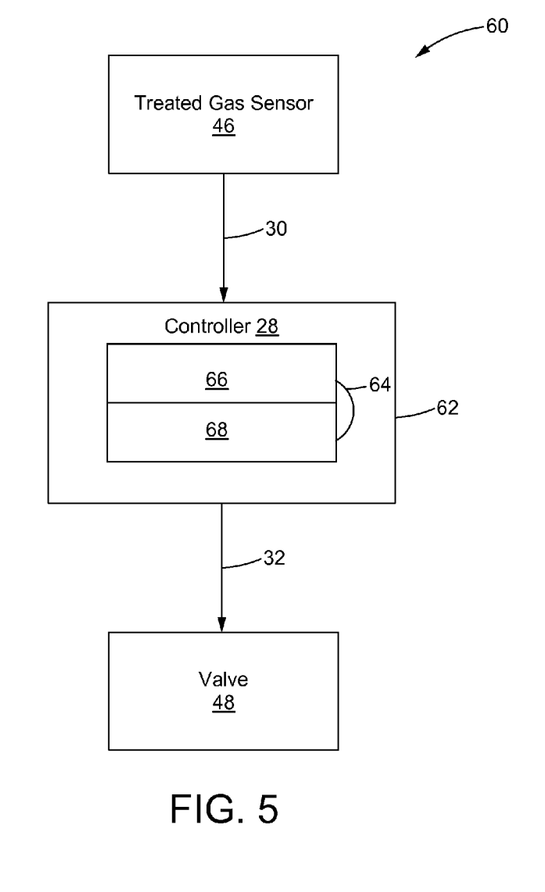
FIG. 5 is a block diagram of an exemplary control system that may be used in conjunction with hydrocarbon separation system of FIG. 2.
Figure 6:
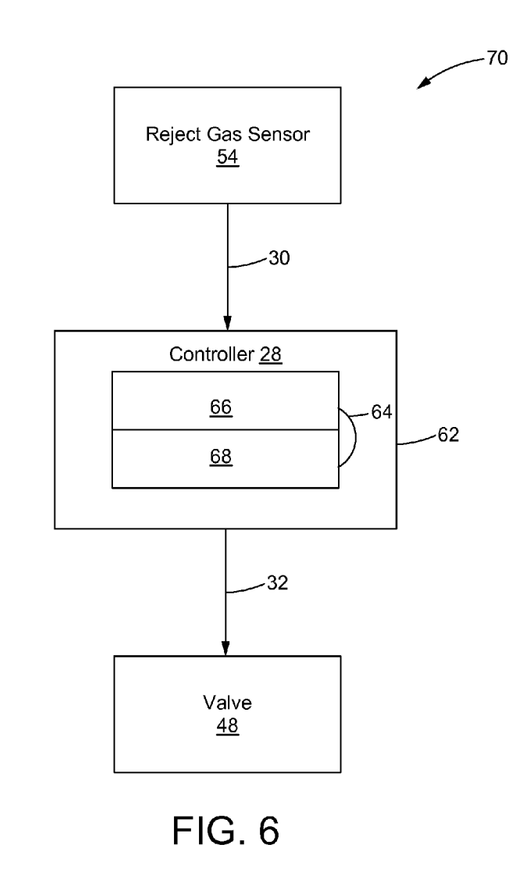
FIG. 6 is a block diagram of an exemplary control system that may be used in conjunction with the hydrocarbon separation systems of FIGS. 3 and 4.

The hydrocarbon separation system 22 may also include an electronic controller 28 that is configured to receive a breakthrough signal 30 (e.g., as illustrated in FIGS. 5 and 6) and transmit a regeneration signal 32 (e.g., as illustrated in FIGS. 5 and 6) in response to the breakthrough signal 30. The electronic controller 28 may be any type of electronic processor such as a dedicated processor on-board the engine 12 or machine employing the engine 12. Alternatively, the electronic controller 28 may be a stand-alone device specifically associated with the hydrocarbon separation system 22.

The raw gas stream 26 may be transported through an untreated gas conduit 34 upstream of and fluidly coupled to the separator 24 that is configured to convey the methane, ethane and other higher carbon chainlength hydrocarbon molecules of the raw gas stream 26 to the separator 24. A fuel source 36 may be located upstream of the untreated gas conduit 34 and supply the raw gas stream 26 to the untreated gas conduit 34. In a preferred embodiment, the fuel source 36 may be natural gas associated with a well-head of an oil field, well-head of a natural gas field, or well-head of a coal bed. The natural gas pipeline associated with the compression station may even be the fuel source 36. However, the fuel source 36 need not be associated with a fossil fuel field or associated compression stations. For example, the fuel source 36 may also be a tank, or other vessel, accompanying a machine configured to hold methane, ethane and other higher carbon chainlength hydrocarbon molecules.

Figure 2:
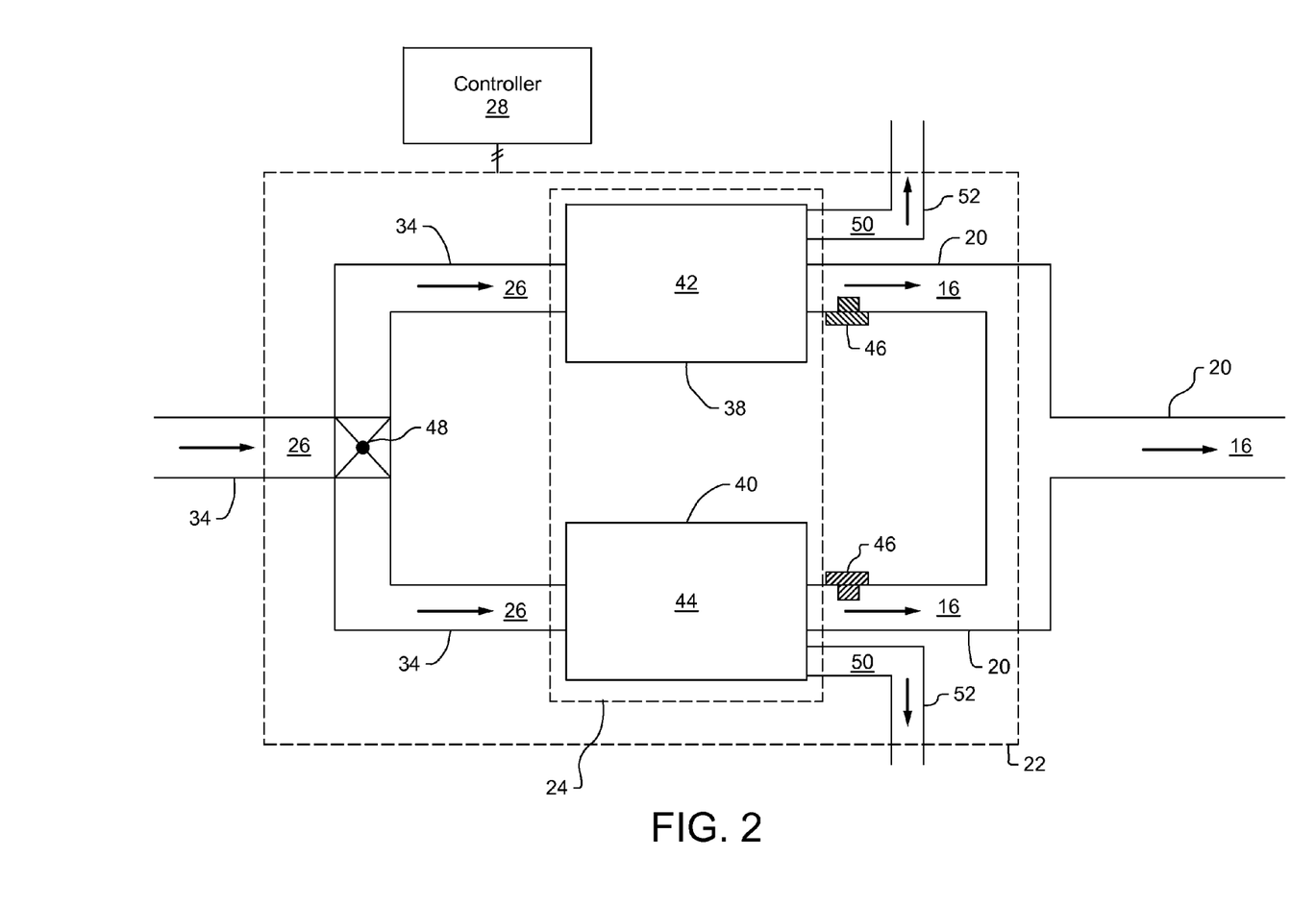
FIG. 2 is a schematic of an exemplary hydrocarbon separation system according to one aspect of the present disclosure.

An exemplary hydrocarbon separation system 22 of the present disclosure is depicted in the schematic of FIG. 2. As described above, the hydrocarbon separation system 22 may include a untreated gas conduit 34 configured to transport a raw gas stream 26 to a separator 24 and a treated gas conduit 20 configured to transport the treated gas stream 16 towards the engine 12. Further, the hydrocarbon separation system 22 may include an electronic controller 28 configured to receive a breakthrough signal 30 and transmit a regeneration signal 32 in response to the breakthrough signal 30.

More specifically, however, the separator 24 of this exemplary embodiment may include a first bed 38 and a second bed 40. Further, the first bed 38 may include a first adsorbent bed 42 comprising a material configured to preferentially adsorb the higher carbon chainlength hydrocarbon molecules of the raw gas stream 26, while allowing methane and ethane of the raw gas stream 26 to pass through the first bed 38 and therefore create the treated gas stream 16. Moreover, the second bed 40 may include a second adsorbent bed 44 comprising a material configured to preferentially adsorb the higher carbon chainlength hydrocarbon molecules of the raw gas stream 26, while allowing methane and ethane of the raw gas stream 26 to pass through the second bed 40 and therefore create the treated gas stream 16.

Example materials configured to adsorb higher carbon chainlength hydrocarbon molecules of the raw gas stream 26 include, but are not limited to, high surface area (greater than about 10 $m^2/g$, preferably greater than about 75 $m^2/g$) alumina, microporous zeolites (preferably with particle sizes less than about 1 mm), other microporous materials, mesoporous materials, ordered mesoporous materials, and the like, and combinations thereof. Non-limiting examples of these materials can include carbon, cationic zeolites, high silica zeolites, zeolite molecular sieves, highly siliceous ordered mesoporous materials, sol-gel materials, ALPO materials (microporous and/or mesoporous materials containing predominantly aluminum, phosphorous, and oxygen), SAPO materials (microporous and/or mesoporous materials containing predominantly silicon, aluminum, phosphorous, and oxygen), MOF materials (microporous and/or mesoporous materials comprised of a metal organic framework), ZIF materials (microporous and/or mesoporous materials comprised of zeolitic imidazolate frameworks), microporous and/or mesoporous sorbent functionalized with functional groups (e.g., including primary, secondary, and tertiary amines, other non-protogenic basic groups such as amidines, guanidines, biguanides, and the like, as well as combinations thereof), and combinations and intergrowths thereof.

The first adsorbent bed 42 and the second adsorbent bed 44 may be operated under processes known as pressure swing adsorption ("PSA"), temperature swing adsorption ("TSA") or pressure temperature swing adsorption ("PTSA"). In PSA, the raw gas stream 26 is passed through an adsorbent bed, such as the first adsorbent bed 42, near ambient temperatures but under elevated pressure, and the higher carbon chainlength hydrocarbon molecules are therefore adsorbed under elevated pressure. Accordingly, the higher carbon chainlength hydrocarbon molecules may be desorbed from the first adsorbent bed 42 or second adsorbent bed 44 and be "regenerated" by lowering the pressure of the adsorbent bed. In TSA, the raw gas stream 26 is passed through the adsorbent bed, such as the first adsorbent bed 42, near ambient pressure but under lowered temperatures, and the higher carbon chainlength hydrocarbon molecules are therefore adsorbed under lowered temperatures. Accordingly, the higher carbon chainlength hydrocarbon molecules may be desorbed from the first adsorbent bed 42 or second adsorbent bed 44 and these beds may therefore be "regenerated" by elevating the temperature of the adsorbent bed. In PTSA, the raw gas stream 26 is passed through the adsorbent bed, such as the first adsorbent bed 42, under elevated pressure and lowered temperature and the higher carbon chainlength hydrocarbon molecules are therefore adsorbed under elevated and lowered temperature. Accordingly, in this instance the higher carbon chainlength hydrocarbon molecules may be desorbed form the first adsorbent bed 42 or second adsorbent bed 44 and therefore be "regenerated" by lowering the pressure of the adsorbent bed, elevating the temperature of the adsorbent bed, or preferably a combination thereof. In a preferred embodiment, this exemplary hydrocarbon separation system 22 utilizes the PSA process. Once the adsorbent bed is "regenerated" it may again be utilized to segregate methane and ethane of the raw gas stream 26 from higher carbon chainlength hydrocarbon molecules of the raw gas stream 26.

When the first bed 38 and second bed 40 utilize materials configured to adsorb the higher carbon chainlength hydrocarbon molecules of the raw gas stream 26, the hydrocarbon separation system 22 may include one or more treated gas sensors 46 associated with the treated gas conduit 20. The treated gas sensor 46 may be configured to measure the concentration of higher carbon chainlength hydrocarbon molecules in the treated gas stream 16 and transmit the breakthrough signal 30 to the electronic controller 28 when the treated gas sensor 46 detects higher carbon chainlength hydrocarbon molecules in the treated gas stream 16 greater than a predetermined amount. In response, the electronic controller 28 may transmit the regeneration signal 32 to a valve 48. The valve 48 may be associated with the untreated gas conduit 34 and be configured to receive the regeneration signal 32 and change the flow direction of the raw gas stream 26 in response to the regeneration signal 32. Consequently, the raw gas stream 26 may begin flowing through the second adsorbent bed 44 and stop flowing through the first adsorbent bed 42.

While the raw gas stream 26 is flowing through the second adsorbent bed 44, the first adsorbent bed 42 may be "regenerated" per one of the desorption processes described above. Accordingly, the desorption of the first adsorbent bed 42 may create a reject gas stream 50 rich in higher carbon chainlength hydrocarbon molecules that is transported away from the separator 24 via a reject gas conduit 52 fluid coupled to the separator 24 and configured to transport the higher carbon chainlength hydrocarbon molecules. The reject gas stream 50 rich in higher carbon chainlength molecules is rich in energy. Accordingly, the reject gas stream 50 may be conveyed to a storage system, such as a tank, where it may be collected and then later sold. Alternatively, the reject gas stream 50 may be returned to the natural gas pipeline associated with the compression station where it may be conveyed to a downstream operation, for example.

The raw gas stream 26 may continue to flow through the second adsorbent bed 44 until the treated gas sensor 46 associated with the treated gas conduit 20 detects higher carbon chainlength hydrocarbon molecules in the treated gas stream 16 greater than a predetermined amount. At this point the treated gas sensor 46 may transmit the breakthrough signal 30 to the electronic controller 28 which transmits the regeneration signal 32 to the valve 48. The valve 48 may then change the flow direction of the raw gas stream 26 so the raw gas stream 26 begins flowing through the first adsorbent bed 42 that has been regenerated and stops flowing through the second adsorbent bed 44. Subsequently, the second adsorbent bed 44 may be "regenerated" in the same manner as the first adsorbent bed 42 per one of the desorption processes described above.

In an alternative embodiment, the first adsorbent bed 42 and the second adsorbent bed 44 may comprise a material configured to preferentially adsorb the methane and/or ethane of the raw gas stream 26, while allowing the higher carbon chainlength hydrocarbon molecules of the raw gas stream 26 to pass through these beds, thereby creating a reject gas stream 50 rich in higher carbon chainlength molecules. A schematic of this exemplary hydrocarbon separation system 22 is disclosed in FIG. 3.

Figure 3:
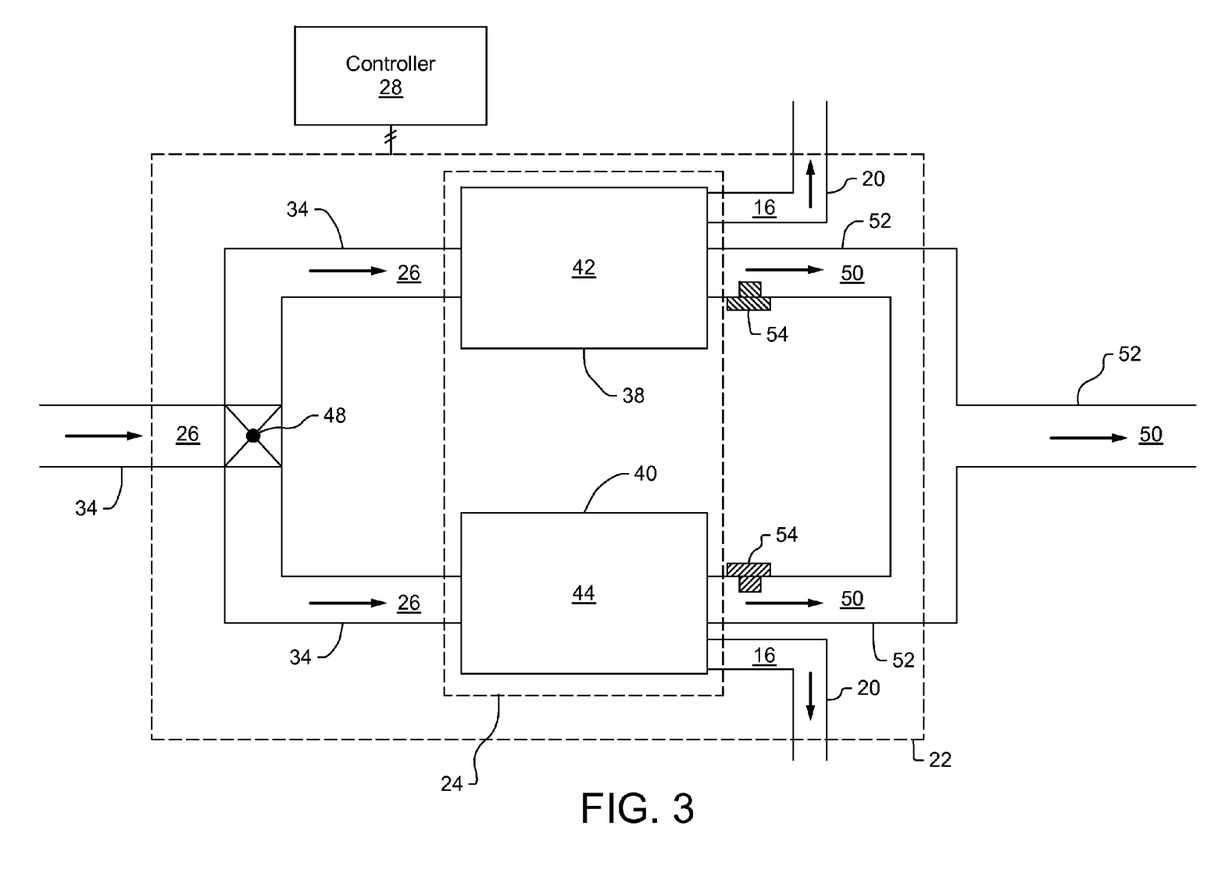
FIG. 3 is a schematic of another exemplary hydrocarbon separation system according to one aspect of the present disclosure.

Example materials configured to adsorb methane and/or ethane of the raw gas stream 26 include, but are not limited to, high surface area (greater than about 10 $m^2/g$, preferably greater than about 75 $m^2/g$) alumina, microporous zeolites (preferably with particle sizes less than about 1 mm), other microporous materials, mesoporous materials, ordered mesoporous materials, and the like, and combinations thereof. Non-limiting examples of these materials can include carbon, cationic zeolites, high silica zeolites, zeolite molecular sieves, highly siliceous ordered mesoporous materials, sol-gel materials, ALPO materials (microporous and/or mesoporous materials containing predominantly aluminum, phosphorous, and oxygen), SAPO materials (microporous and/or mesoporous materials containing predominantly silicon, aluminum, phosphorous, and oxygen), MOF materials (microporous and/or mesoporous materials comprised of a metal organic framework), ZIF materials (microporous and/or mesoporous materials comprised of zeolitic imidazolate frameworks), microporous and/or mesoporous sorbent functionalized with functional groups (e.g., including primary, secondary, and tertiary amines, other non-protogenic basic groups such as amidines, guanidines, biguanides, and the like, as well as combinations thereof), and combinations and intergrowths thereof.

Like above, the first adsorbent bed 42 and the second adsorbent bed 44 in this embodiment may be operated under a PSA process, a TSA process or a PTSA process. Accordingly, the methane and/or ethane adsorbed on the first adsorbent bed 42 or the second adsorbent bed 44 may be desorbed and the bed may be "regenerated" per one of the desorption processes described above. In one embodiment, this alternative exemplary hydrocarbon separation system 22 utilizes a PSA process.

When the first bed 38 and second bed 40 utilize materials configured to adsorb the methane and/or ethane of the raw gas stream 26, the hydrocarbon separation system 22 may include one or more reject gas sensors 54 associated with the reject gas conduit 52. The reject gas sensor 54 may be configured to measure the concentration of methane and/or ethane in the reject gas stream 50 and transmit the breakthrough signal 30 to the electronic controller 28 when the reject gas sensor 54 detects methane and/or ethane in the reject gas stream 50 greater than a predetermined amount. In response, the electronic controller 28 may transmit the regeneration signal 32 to the valve 48. The valve 48 may be associated with the untreated gas conduit 34 and be configured to receive the regeneration signal 32 and change the flow direction of the raw gas stream 26 in response to the regeneration signal 32. Consequently, the raw gas stream 26 may begin flowing through the second adsorbent bed 44 and stop flowing through the first adsorbent bed 42.

While the raw gas stream 26 is flowing through the second adsorbent bed 44, the first adsorbent bed 42 may be "regenerated" per one of the desorption processes described above. Accordingly, the desorption of the first adsorbent bed 42 may create a treated gas stream 16 rich in methane and/or ethane that is transported towards the engine 12 via the treated gas conduit 20.

The raw gas stream 26 may continue to flow through the second adsorbent bed 44 until the reject gas sensor 54 associated with the reject gas conduit 52 detects methane and/or ethane in the reject gas stream 50 greater than the predetermined amount. At this point the reject gas sensor 54 may transmit the breakthrough signal 30 to the electronic controller 28 which sends the regeneration signal 32 to the valve 48. The valve 48 may then change the flow direction of the raw gas stream 26 so the raw gas stream 26 begins flowing through the first adsorbent bed 42 that has been regenerated and stops flowing through the second adsorbent bed 44. Subsequently, the second adsorbent bed 44 may be "regenerated" in the same manner as the first adsorbent bed 42 per one of the desorption processes described above.

The reject gas stream 50 rich in higher carbon chainlength molecules is rich in energy. Accordingly, the reject gas stream 50 may be conveyed to a storage system, such as a tank, where it may be collected and then later sold. Alternatively, the reject gas stream 50 may be returned to the natural gas pipeline associated with the compression station where it may be conveyed to a downstream operation, for example.

Figure 4:
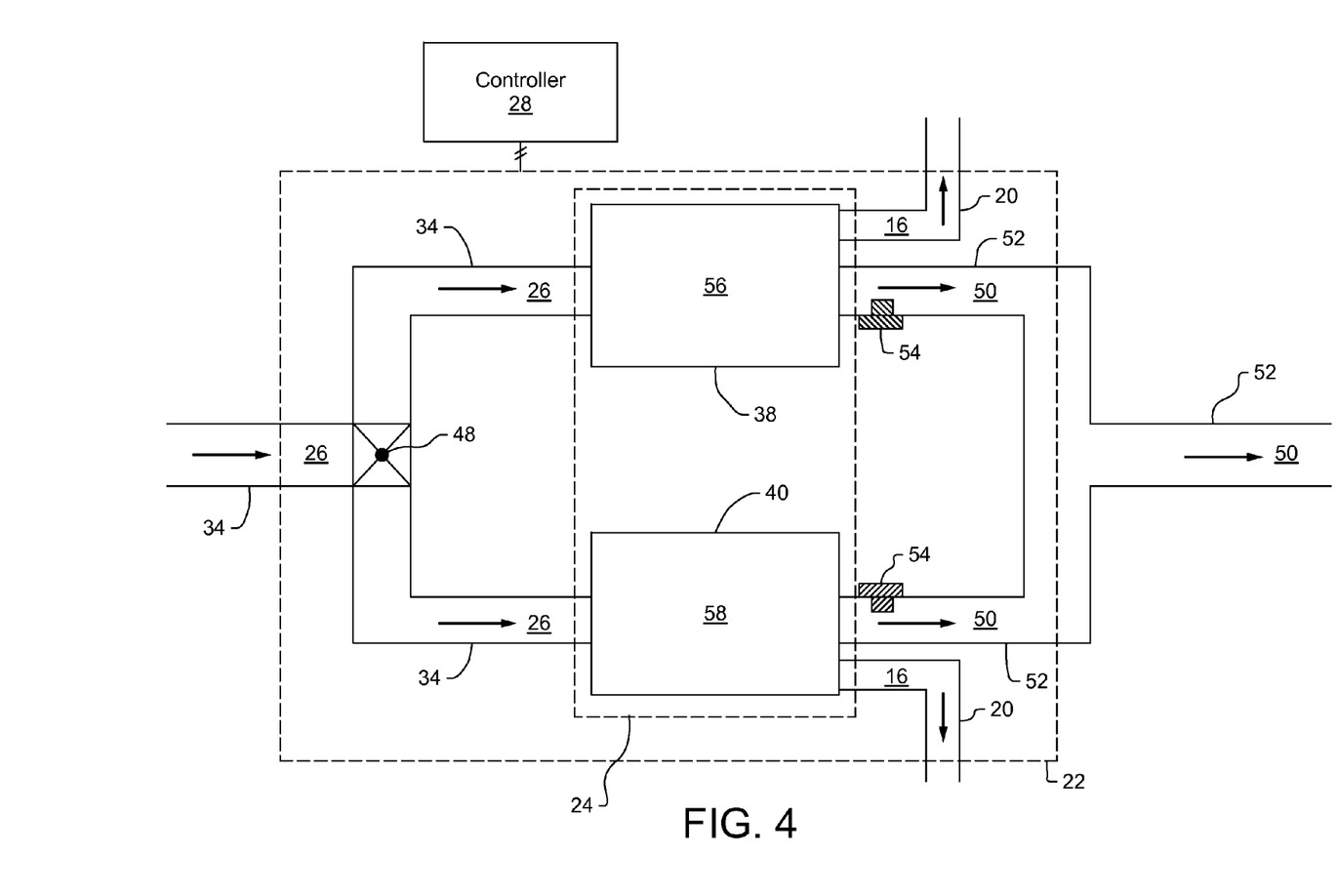
FIG. 4 is a schematic of another exemplary hydrocarbon separation system according to one aspect of the present disclosure.

In an additional alternative embodiment, the first bed 38 may include a first exclusion bed 56 and the second bed 40 may include a second exclusion bed 58. The first exclusion bed 56 and the second exclusion bed 58 may comprise a material having pores sized to permit methane and ethane of the raw gas stream 26 to enter into the pores, while precluding passage of the higher carbon chainlength hydrocarbon molecules of the raw gas stream 26 into the pores, thereby creating a reject gas stream 50 rich in higher carbon chainlength molecules. This exemplary hydrocarbon separation system 22 is depicted in the schematic of FIG. 4.

Example materials having pores sized to permit methane and/or ethane of the raw gas stream 26 to enter the pores, while precluding the higher carbon chainlength hydrocarbon molecules from entering the pores include, but are not limited to, high surface area (greater than about 10 $m^2/g$, preferably greater than about 75 $m^2/g$) microporous zeolites, titanium silicates and metal organic frameworks (preferably with particle sizes less than about 1 mm). Non-limiting examples of these materials can include zeolite molecular sieves, titanium silicate molecular sieves, sol-gel materials and metal organic frameworks. An important characteristic of these materials is the ability to create pores having an average diameter of about 4 angstroms.

The first exclusion bed 56 and the second exclusion bed 58 may be operated under a PSA, a TSA or a PTSA process. In this PSA process however, the raw gas stream 26 is passed through the exclusion bed, such as the first exclusion bed 56, near ambient temperatures but elevated pressures, and the methane and/or ethane enter the appropriately sized pores under pressure, while allowing the higher carbon chainlength hydrocarbon molecules to pass through the exclusion bed. Accordingly, the methane and/or ethane trapped in the appropriately sized pores may be released from the pores, and these beds may therefore be "regenerated" by lowering the pressure of the exclusion bed. In this TSA process, the raw gas stream 26 is passed through the exclusion bed, such as the first exclusion bed 56, near ambient pressure but under lowered temperatures, and the methane and/or ethane enter the appropriately sized pores under lowered temperatures, while allowing the higher carbon chainlength hydrocarbon molecules to pass through the exclusion bed. Accordingly, the methane and/or ethane trapped in the appropriately sized pores may be released from the pores, and these beds may therefore be "regenerated" by raising the temperature of the exclusion bed. In this PTSA process, the raw gas stream 26 is passed through the exclusion bed, such as the first exclusion bed 56, under elevated pressure and lowered temperature and the methane and/or ethane enter the appropriately sized pores under pressure and lowered temperature, while allowing the higher carbon chainlength hydrocarbon molecules to pass through the exclusion bed. Accordingly, the methane and/or ethane trapped in the appropriately sized pores may be released from the pores, and these beds may therefore be "regenerated" by lowering the pressure of the adsorbent bed, elevating the temperature of the adsorbent bed, or a combination thereof. In one embodiment, this additional exemplary hydrocarbon separation system 22 utilizes the PSA process. Once the exclusion bed is "regenerated" it may again be utilized to segregate methane and ethane of the raw gas stream 26 from higher carbon chainlength hydrocarbon molecules of the raw gas stream 26.

When the first bed 38 and second bed 40 utilize materials having pores sized to permit methane and ethane of the raw gas stream 26 to enter into the pores, while precluding passage of the higher carbon chainlength hydrocarbon molecules of the raw gas stream 26 into the pores the hydrocarbon separation system 22 may include one or more reject gas sensors 54 associated with the reject gas conduit 52. The reject gas sensor 54 may be configured to measure the concentration of methane and/or ethane in the reject gas stream 50 and transmit the breakthrough signal 30 to the electronic controller 28 when the reject gas sensor 54 detects methane and/or ethane in the reject gas stream 50 greater than a predetermined amount. In response, the electronic controller 28 may transmit the regeneration signal 32 to the valve 48. The valve 48 may be associated with the untreated gas conduit 34 and be configured to receive the regeneration signal 32 and change the flow direction of the raw gas stream 26 in response to the regeneration signal 32. Consequently, the raw gas stream 26 may begin flowing through the second exclusion bed 58 and stop flowing through the first exclusion bed 56.

While the raw gas stream 26 is flowing through the second exclusion bed 58, the first exclusion bed 56 may be "regenerated" per one of the desorption processes described above. Accordingly, the desorption of the first exclusion bed 56 may create a treated gas stream 16 rich in methane and/or ethane that is transported towards the engine 12 via the treated gas conduit 20.

The raw gas stream 26 may continue to flow through the second exclusion bed 58 until the reject gas sensor 54 associated with the reject gas conduit 52 detects methane and/or ethane in the reject gas stream 50 greater than the predetermined amount. At this point the reject gas sensor 54 may transmit the breakthrough signal 30 to the electronic controller 28 which sends the regeneration signal 32 to the valve 48. The valve 48 may then change the flow direction of the raw gas stream 26 so the raw gas stream 26 begins flowing through the first exclusion bed 56 that has been regenerated and stops flowing through the second exclusion bed 58. Subsequently, the second exclusion bed 58 may be "regenerated" in the same manner as the first exclusion bed 56 per one of the desorption processes described above.

The reject gas stream 50 rich in higher carbon chainlength molecules is rich in energy. Accordingly, the reject gas stream 50 may be conveyed to a storage system, such as a tank, where it may be collected and then later sold. Alternatively, the reject gas stream 50 may be returned to the natural gas pipeline associated with the compression station where it may be conveyed to a downstream operation, for example.

Turning now to FIG. 5, an exemplary control system that may be utilized with hydrocarbon separation system 22 disclosed in FIG. 2 is illustrated and is generally referred to by the reference numeral 60. The control system 60 may include a sensor, such as the treated gas sensor 46 previously described. Further, as seen in FIG. 5, the treated gas sensor 46 may be operatively coupled to the electronic controller 28 and configured to transmit a breakthrough signal 30 to the electronic controller 28. The electronic controller 28 may be implemented to control the operation of the hydrocarbon separation system 22. The electronic controller 28 may include a microprocessor 62 for executing specified programs that control and monitor various functions associated with the hydrocarbon separation system 22, including receiving the breakthrough signal 30 and transmitting the regeneration signal 32. The microprocessor 62 may be associated with a memory 64, such as read only memory (ROM) 66, for storing a program or programs, and a random access memory (RAM) 68 which serves as a working area for use in executing the programs stored in memory 66. The random access memory 68 may also store data whether the raw gas stream 26 is currently flowing through the first bed 38 or the second bed 40. Although microprocessor 62 is shown, it is also possible and contemplated to use other electronic components such as a microcontroller, an ASIC (application specific integrated circuit) chip or any other integrated circuit device.

The electronic controller 28 may be operatively connected to the valve 48. Further, the electronic controller 28 may transmit the regeneration signal 32 to the valve 48. In response, the valve 48 may change the flow direction of the raw gas stream 26 so the raw gas stream 26 begins flowing through the second bed 40 and stops flowing through the first bed 38. Alternatively, the valve 48 may change the flow direction of the raw gas stream 26 so the raw gas stream 26 begins flowing through the first bed 38 and stops flowing through the second bed 40.

Turning to FIG. 6, an exemplary control system that may be utilized with hydrocarbon separation system 22 disclosed in FIGS. 3 and 4 is illustrated and is generally referred to by the reference numeral 70. The control system 70 may include a sensor, such as the reject gas sensor 54 previously described. Further, as seen in FIG. 6, the reject gas sensor 54 may be operatively coupled to the electronic controller 28 and configured to transmit a breakthrough signal 30 to the electronic controller 28. The electronic controller 28 may be implemented to control the operation of the hydrocarbon separation system 22. The electronic controller 28 may include a microprocessor 62 for executing specified programs that control and monitor various functions associated with the hydrocarbon separation system 22, including receiving the breakthrough signal 30 and transmitting the regeneration signal 32. The microprocessor 62 may be associated with a memory 64, such as read only memory (ROM) 66, for storing a program or programs, and a random access memory (RAM) 68 which serves as a working area for use in executing the programs stored in memory 66. The random access memory 68 may also store data whether the raw gas stream 26 is currently flowing through the first bed 38 or the second bed 40. Although microprocessor 62 is shown, it is also possible and contemplated to use other electronic components such as a microcontroller, an ASIC (application specific integrated circuit) chip or any other integrated circuit device.

The electronic controller 28 may be operatively connected to the valve 48. Further, the electronic controller 28 may transmit the regeneration signal 32 to the valve 48. In response, the valve 48 may change the flow direction of the raw gas stream 26 so the raw gas stream 26 begins flowing through the second bed 40 and stops flowing through the first bed 38. Alternatively, the valve 48 may change the flow direction of the raw gas stream 26 so the raw gas stream 26 begins flowing through the first bed 38 and stops flowing through the second bed 40.

INDUSTRIAL APPLICABILITY

In operation, the teachings of the present disclosure can find applicability in many industrial applications, such as, but not limited to, a fuel supply system 18 for an engine 12 providing power to compressors for natural gas pipelines. Engine 12 may be, for example, a spark ignition engine or a compression ignition engine such as a diesel engine, a homogenous charge compression ignition engine, or a reactivity controlled compression ignition engine, or other compression ignition engine known in the art. The engine 12 may be fueled by a fuel source 36 such as natural gas associated with a well-head of an oil field, well-head of a natural gas field, or well-head of a coal bed. Alternatively, the fuel source 36 may be the natural gas associated with a natural gas pipeline itself. Further, the fuel source 36 may also be a tank, or other vessel, accompanying a machine with an engine 12 configured to hold methane, ethane and other higher carbon chainlength hydrocarbon molecules.

Figure 7:
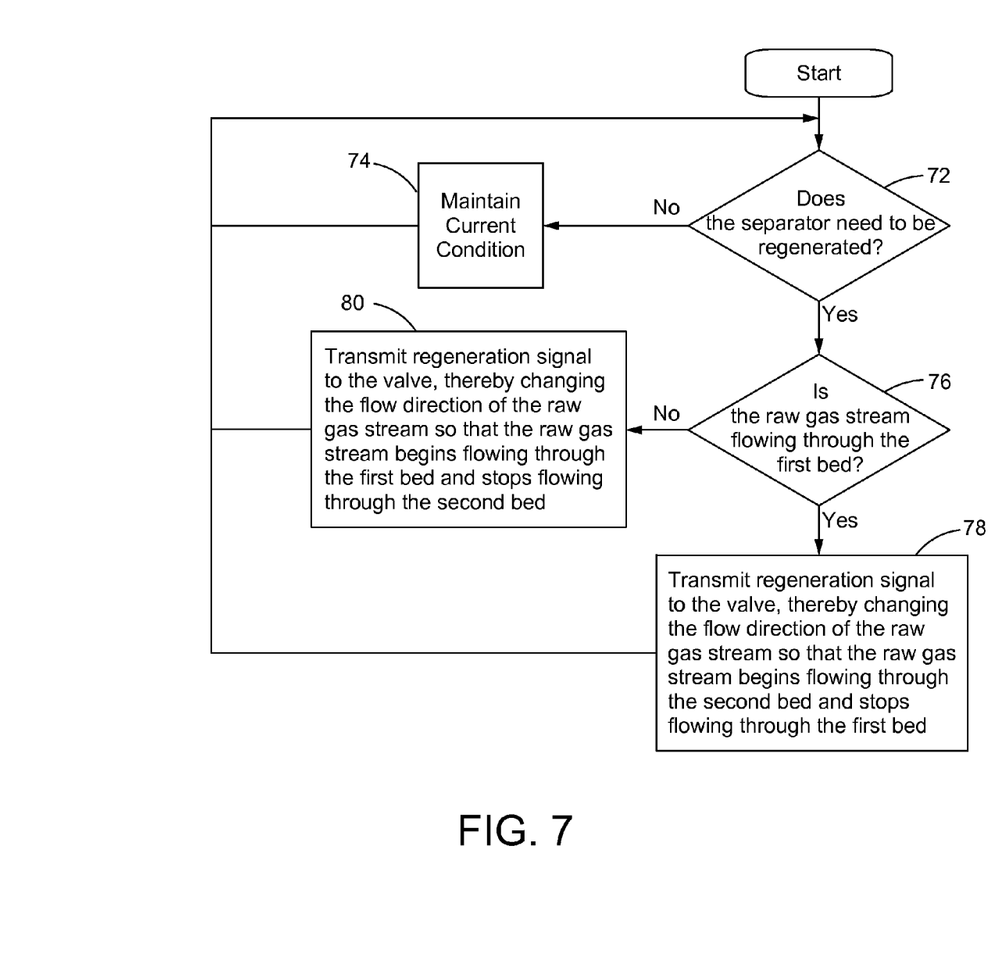
FIG. 7 is a flowchart illustrating exemplary steps of a method for delivering fuel to an engine of the present disclosure.

Referring now to FIG. 7, an exemplary flowchart is shown depicting a sample sequence of steps which may be followed to deliver methane and/or ethane fuel to an engine system 10 utilizing the hydrocarbon separation systems 22 and control systems 60, 70 of the present disclosure. Step 72 of the method may include determining whether the separator 24 needs to be regenerated. For example, as described before, the treated gas sensor 46 may measure the concentration of higher carbon chainlength hydrocarbon molecules in the treated gas stream 16 and transmit a breakthrough signal 30 to the electronic controller 28 when this concentration is above a predetermined amount. Alternatively, as described above, the reject gas sensor 54 may measure the concentration of methane and/or ethane in the reject gas stream 50 and transmit a breakthrough signal 30 to the electronic controller 28 when this concentration is above a predetermined amount. The electronic controller 28 may utilize the breakthrough signal 30 and determine whether the separator 24 needs to be regenerated. If the electronic controller 28 determines the separator 24 does not require regeneration, then the current conditions may be maintained at step 74 and the method may return to step 72.

However, if the separator 24 does need regeneration, then the electronic controller 28 may determine whether the raw gas stream 26 is flowing through the first bed 38 at step 76. As described above, the random access memory 68 of the electronic controller 28 may be used to store data whether the raw gas stream 26 is currently flowing through the first bed 38 or the second bed 40. If the raw gas stream 26 is flowing through the first bed 38 then the electronic controller 28 may transmit the regeneration signal 32 to the valve 48 and thereafter the raw gas stream 26 may begin flowing through the second bed 40, and stops flowing through the first bed 38, at step 78, and the first bed 38 may be "regenerated" per one of the desorption processes describe above. Subsequently, the method may return to step 72.

Alternatively, if the raw gas stream 26 is flowing through the second bed 40, the electronic controller 28 may transmit the regeneration signal 32 to the valve 48 at step 80, but in this instance the valve 48 changes the flow direction so the raw gas stream 26 begins flowing through the first bed 38 and stops flowing through the second bed 40, and the second bed 40 may be "regenerated" per one of the desorption processes described above. Thereafter, the method may return to step 72.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A hydrocarbon separation system for an engine fuel supply system, comprising:
   an untreated gas conduit configured to transport a raw gas stream including methane, ethane and higher carbon chainlength hydrocarbon molecules;
   a separator downstream of and fluidly coupled to the untreated gas conduit configured to segregate the methane or the ethane of the raw gas stream from the higher carbon chainlength hydrocarbon molecules of the raw gas stream;
   a treated gas conduit downstream of and fluidly coupled to the separator configured to transport the methane or the ethane of the raw gas stream away from the separator; and
   an electronic controller configured to receive a breakthrough signal and transmit a regeneration signal in response to the breakthrough signal; and
   a reject gas conduit downstream of and fluidly coupled to the separator configured to transport the higher carbon chainlength hydrocarbon molecules and a reject gas sensor associated with the reject gas conduit configured to transmit the breakthrough signal to the electronic controller when the reject gas sensor detects the methane or the ethane in the reject gas conduit above a predetermined amount.

2. The hydrocarbon separation system according to claim 1, further including a treated gas sensor associated with the treated gas conduit configured to transmit the breakthrough signal to the electronic controller when it detects the higher carbon chainlength hydrocarbon molecules in the treated gas conduit above a predetermined amount.

3. The hydrocarbon separation system according to claim 2, wherein the separator includes a first adsorbent bed configured to preferentially adsorb the higher carbon chainlength hydrocarbon molecules.

4. The hydrocarbon separation system according to claim 3, wherein the separator further includes a second adsorbent bed configured to preferentially adsorb the higher carbon chainlength hydrocarbon molecules.

5. The hydrocarbon separation system according to claim 4, wherein the raw gas stream begins flowing through the second adsorbent bed, and stops flowing through the first adsorbent bed, in response to the regeneration signal.

6. The hydrocarbon separation system according to claim 1, wherein the separator includes a first adsorbent bed configured to preferentially adsorb the methane or the ethane of the raw gas stream.

7. The hydrocarbon separation system according to claim 6, wherein the separator further includes a second adsorbent bed configured to preferentially adsorb the methane or the ethane of the raw gas stream.

8. The hydrocarbon separation system according to claim 7, wherein the raw gas stream begins flowing through the second adsorbent bed, and stops flowing through the first adsorbent bed, in response to the regeneration signal.

9. The hydrocarbon separation system according to claim 1, wherein the separator includes a first exclusion bed having pores sized to permit the methane or the ethane of the raw gas stream to enter into the pores, while precluding passage of the higher carbon chainlength hydrocarbon molecules into the pores.

10. The hydrocarbon separation system according to claim 9, wherein the separator further includes a second exclusion bed having pores sized to permit the methane or the ethane of the raw gas stream to enter into the pores, while precluding passage of the higher carbon chainlength hydrocarbon molecules into the pores.

11. The hydrocarbon separation system according to claim 10, wherein the raw gas stream begins flowing through the second exclusion bed, and stops flowing through the first exclusion bed, in response to the regeneration signal.

12. An engine system, comprising:
    an engine;
    an intake manifold upstream of and fluidly coupled to the engine configured to transport a treated gas stream including methane or ethane to the engine;
    a treated gas conduit upstream of and fluidly coupled to the intake manifold configured to transport the treated gas stream to the intake manifold;
    a separator upstream of and fluidly coupled to the treated gas conduit configured to isolate the methane or the ethane of a raw gas stream from higher carbon chainlength hydrocarbon molecules of the raw gas stream;
    an untreated gas conduit upstream of and fluidly coupled to the separator configured to transport the raw gas stream including the methane, the ethane and the higher carbon chainlength hydrocarbon molecules, to the separator;
    a fuel source upstream of and fluidly coupled to the untreated gas conduit configured to deliver the raw gas stream including the methane, ethane and the higher carbon chainlength hydrocarbon molecules;
    an electronic controller configured to receive a breakthrough signal and transmit a regeneration signal in response to the breakthrough signal; and a reject gas conduit downstream of and fluidly coupled to the separator configured to transport the higher carbon chainlength hydrocarbon molecules of the raw gas stream, and a reject gas sensor associated with the reject gas conduit configured to transmit the breakthrough signal to the electronic controller when the reject gas sensor detects the methane or the ethane of the raw gas stream in the reject gas conduit above a predetermined amount.

13. The engine system according to claim 12, further including a treated gas sensor associated with the treated gas conduit configured to transmit the breakthrough signal to the electronic controller when the treated gas sensor detects the higher carbon chainlength hydrocarbon molecules in the treated gas conduit above a predetermined amount, wherein the separator includes a first adsorbent bed configured to preferentially adsorb the higher carbon chainlength hydrocarbon molecules of the raw gas stream, the separator further includes a second adsorbent bed configured to preferentially adsorb the higher carbon chainlength hydrocarbon molecules of the raw gas stream, and wherein the raw gas stream begins flowing through the second adsorbent bed, and stops flowing through the first adsorbent bed, in response to the regeneration signal.

14. The engine system according to claim 12, wherein the separator includes a first adsorbent bed configured to preferentially adsorb the methane or the ethane of the raw gas stream, the separator further includes a second adsorbent bed configured to preferentially adsorb the methane or the ethane of the raw gas stream, and wherein the raw gas stream begins flowing through the second adsorbent bed, and stops flowing through the first adsorbent bed, in response to the regeneration signal.

15. The engine system according to claim 12, wherein the separator includes a first exclusion bed having pores sized to permit the methane or the ethane of the raw gas stream to enter into the pores, while precluding passage of the higher carbon chainlength hydrocarbon molecules of the raw gas stream into the pores, the separator further includes a second exclusion bed having pores sized to permit the methane or the ethane of the raw gas stream to enter into the pores, while precluding passage of the higher carbon chainlength hydrocarbon molecules into the pores, and wherein the raw gas stream begins flowing through the second exclusion bed, and stops flowing through the first exclusion bed, in response to the regeneration signal.

16. A method of delivering fuel to an engine, comprising:
configuring a separator to segregate methane or ethane of a raw gas stream from higher chainlength hydrocarbon molecules of the raw gas stream, wherein configuring the separator includes one of utilizing a first adsorbent bed configured to preferentially adsorb the methane or the ethane of the raw gas stream and a second adsorbent bed configured to preferentially adsorb the methane or the ethane of the raw gas stream, or utilizing a first exclusion bed having pores sized to permit the methane or the ethane of the raw gas stream to enter into the pores while precluding passage of the higher chainlength hydrocarbon molecules of the raw gas stream into the pores and a second exclusion bed having pores sized to permit the methane or the ethane of the raw gas stream to enter into the pores while precluding passage of the higher chainlength hydrocarbon molecules of the raw gas stream into the pores;

fluidly coupling an untreated gas conduit to the separator, the untreated gas conduit located upstream of the separator and configured to transport the raw gas stream to the separator;

associating a valve with the untreated gas conduit configured to receive a regeneration signal and change flow direction of the raw gas stream through the separator, wherein the valve changes flow direction of the raw gas stream so it begins flowing through one of the second adsorbent bed or the second exclusion bed, and stops flowing through one of the first adsorbent bed or the first exclusion bed, in response to the regeneration signal;

fluidly coupling a treated gas conduit to the separator, the treated gas conduit located downstream of the separator and configured to transport the methane or the ethane of the raw gas stream away from the separator towards the engine;

determining whether the separator needs to be regenerated;

sending the regeneration signal to the valve when the separator needs to be regenerated; and fluidly coupling a reject gas conduit to the separator, the reject gas conduit located downstream of the separator and configured to transport, the higher chainlength hydrocarbon molecules of the raw gas stream away from the separator.

\* \* \* \* \*